No. 826,971. PATENTED JULY 24, 1906.
B. F. STOWELL.
TRUING-UP INDICATOR.
APPLICATION FILED APR. 23, 1906.
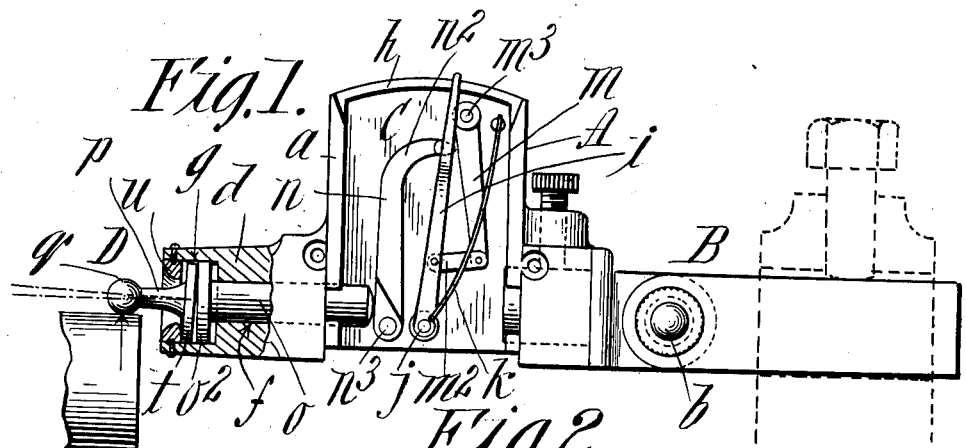
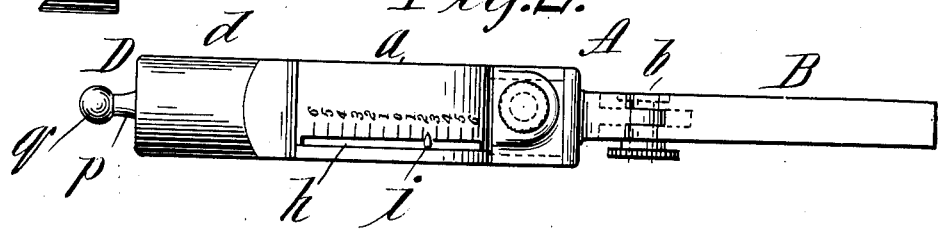
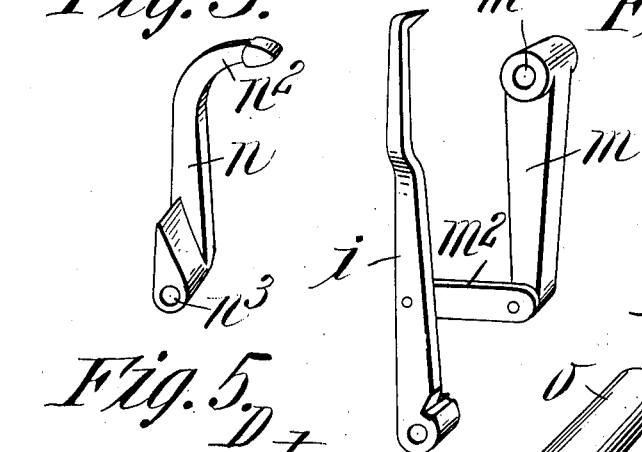
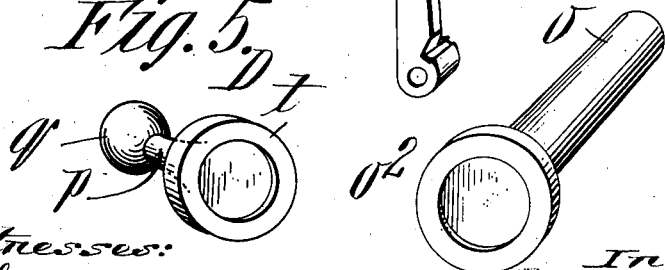
Witnesses:
J. L. Garfield
G. R. Driscoll
Inventor
Byron F. Stowell,
by Wm. F. Beelen
Attorney.

UNITED STATES PATENT OFFICE.

BYRON F. STOWELL, OF SPRINGFIELD, MASSACHUSETTS.

TRUING-UP INDICATOR.

No. 826,971.   Specification of Letters Patent.   Patented July 24, 1906.

Application filed April 23, 1906. Serial No. 313,164.

*To all whom it may concern:*

Be it known that I, BYRON F. STOWELL, a citizen of the United States of America, and a resident of Springfield, in the county of Hampden and State of Massachusetts, have invented certain new and useful Improvements in Truing-Up Indicators, of which the following is a full, clear, and exact description.

This invention relates to improvements in indicators available especially in machine-shops and to be used more often as a centering-indicator to determine if a part in a lathe is chucked truly in alinement with the head and tail stock centers, the same, however, being capable of utilization for determining the accuracy of plane surfaces, such as the face of a plate or piece rotatably mounted in a lathe or carried on a planer-bed, and an indicator of the class to which this invention relates may be employed otherwise than as above mentioned.

A leading object is to so construct the device that it is most readily capable of making its indication of the extent that the work is off from center or out of true irrespective of the line of direction of presentation of the contacting portion of the indicating device against the piece the accuracy in shape or positioning of which is to be determined.

Other objects are to acquire simplicity and cheapness of construction and general efficiency; and the invention consists in an indicating device constituted as hereinafter fully described, and set forth in the claims.

In the drawings, Figure 1 is a front view of the device with the front plate of its casing removed for disclosing more clearly the indicator constructions and having an end portion thereof broken away in longitudinal section. Fig. 2 is a top edge or plan view. Figs. 3 and 4 are perspective views showing lever-like parts comprised in the indicator. Fig. 5 is a perspective view of the stud, and Fig. 6 is a perspective view of the indicator-actuating slide-bar with which the stud coacts.

Similar characters of reference indicate corresponding parts in all of the views.

In the drawings, A represents the holder, carried by a shank or supporting-bar B, which is swivel-connected, so that the casing portion $a$, in which the indicator proper, C, is inclosed, may have a rotational motion on an axis coincident with the length of the shank-bar, which latter is itself jointed at $b$, so that one part may be swung angular to the other for general convenience in the employment of the device.

The holder A has an extension $d$ projecting from the vertical edge of the casing in a direction oppositely from the shank-bar, and through this extension $d$ is a straight round hole or bore $f$, communicating with the space within the casing. The said hole or bore is greatly widened at the outer end of the extension $d$ to constitute a cylindrical socket or chamber $g$.

The upper edge of the casing is of convex form and has a slot or aperture $h$ therethrough, along which may play the extremity of the pointer of the indicator C, which part is constructed in the form of a lever $i$, the lower portion of which is pivoted at $j$ within and at an intermediate part of the casing $a$. The spring $k$ exerts a tendency to maintain the pointer end of the lever $i$ at the left-hand end of the slot $h$. The lever $m$ is pivotally mounted and depends from an upper part of the casing and is by linked lever $m^2$ connected with the pointer-lever $i$. Another lever $n$ is at its lower end pivoted in a lower portion of the casing and has its angularly-turned upper extremity $n^2$ in engagement against the side or edge of the lever $m$ near the fulcrum $m^3$ of the latter, all so that the very slight movement imparted to the lever end near its pivot $m^3$ will impart a very much multiplied movement to the indicating extremity of the pointer-lever $i$.

$o$ represents an actuating-bar for the lever devices comprised in the indicator, the same being fitted and slidable in the aforementioned bore $f$ through the extension $d$, and said bar $o$ has a flange or diametrically-enlarged head $o^2$ at its outer end, which is fitted or accommodated in the chamber enlargement $g$.

D represents a stud which by its form and arrangement for coaction relatively to the other parts of the device is a very important constituent in this invention, and it will be perceived that said stud is formed with a stem $p$, a ball end $q$, outwardly located, and a flange or enlargement $t$ at its inner end circular in form and having its inner face plane or flat, and the diameter of this flange or stud enlargement is enough less than the diameter of the chamber enlargement $g$ to permit the stud to have a rocking or swinging movement in any direction transversely of its normal axis.

$u$ represents an annular retainer fitted in the orifice of the chamber enlargements $g$ and preventing the outward displacement of the stud and actuating-bar $o$.

Normally the parts of the indicator are maintained with the point of the indicator-lever at one end of the slot $h$, the actuating-bar $o$ forced to its outward limit and in flat face contact against the stud-flange $t$, which is crowded closely against the retaining-ring $u$, with its flat inner end face in a plane truly perpendicular to the axis of the bar $o$, and the bore in which these parts are disposed. Of course any pressure directly endwise against the stud will crowd the latter endwise inwardly, directly transmitting motion to the indicator-actuating bar $o$ to give the proper indication by the pointer $i$ on the graduated edge of the casing; but in the presentation of the indicator so that the stud has contact against the piece the accuracy or positioning of which is to be determined, so that the line of bearing force between the contacting parts is in any degree angular to the normal axis of the bar $o$ and stud is such as to impart a rocking movement to the stud, it will, as will be clearly understood on reference to Fig. 1, exert an inwardly-crowding action against the bar $o$ for the actuation of the indicator, and there is no line or direction of presentation which the projecting portion of the stud may practically have against any part or piece of work which would not be effective to cause through the medium of the stud an actuation of the indicator.

I claim—

1. A work-truing device consisting of a holder carrying an indicator movable therein, and a stud comprising a portion projecting beyond the holder, and for endwise or sidewise contact against the work to be trued, and having its opposite end portion non-attached to, but in contact against, an adjacent movable part of the indicator and capable of rocking movements transversely of its length, in said holder, and operable, either by endwise thrust, or its rocking movements, to actuate the indicator.

2. A work-truing device consisting of a holder carrying an indicator comprising an endwise-sliding actuating-bar and a stud endwise engaging said actuating-bar and capable of rocking movements, transversely of its length, in said holder and operable to exert an endwise-forcing action against said bar.

3. A work-truing device consisting of a holder carrying an indicating device which comprises an endwise-sliding actuating-bar having a widened end, and a stud, constructed with a widened end located in a chamber therefor in the holder, and having a stem projecting beyond the holder, said stud being capable of rocking movements transversely of its length, for the purposes set forth.

4. A work-truing device consisting of a holder comprising a casing formed with an apertured top or side, and said holder having a longitudinal bore in communication with the casing-opening made with a widened cylindrical chamber, a pointer pivotally mounted in said chamber and with its extremity protruding through said aperture, levers pivotally mounted in the chamber articulated one with another and with the pointer-lever, a bar slidable in said bore and having an enlarged flat-faced end or head, a stud having a flanged or widened flat-faced inner end located in the chambered enlargement of said bore and having its end face in bearing against the enlarged flat end face of said bar, and having a stem projecting to the exterior of the holder, and capable of a rocking movement relatively to the latter, and means for retaining the said stud against displacement from the holder.

5. A work-truing device consisting of a holder comprising a casing made with a slot or aperture and having a bore through a portion thereof which communicates with the opening in said casing and has an enlarged cylindrical chamber at the outer end thereof, a movable indicator in said casing appurtenant to which is an actuating-bar slidable in said bore and having an enlarged head within said cylindrical enlargement, a stud comprising a stem, and an inner end flat-faced flange, smaller in diameter than that of the chamber enlargement, and an annular part at the end of the holder for retaining the stud-flange in its coöperative proximity to the outer end of said actuating-bar.

6. A work-truing device consisting of a holder having a casing made with a slot or aperture, and having a bore through a portion thereof which communicates with said opening in the casing, an indicating device consisting of a pointer-lever pivoted in the casing and projecting through said aperture, a lever pivoted in the casing and linked to the pointer-lever, another lever pivoted in the casing and having an angularly-turned extremity in contact against the link-connected lever adjacent its pivot, and a bar movable in said bore and having its inner end in engagement with said angular lever, together with a stud endwise engaging said bar and capable of rocking movement, transversely of its length, in said holder, and operable to endwise force said bar.

Signed by me at Springfield, Massachusetts, in presence of two subscribing witnesses.

BYRON F. STOWELL.

Witnesses:
WM. S. BELLOWS,
G. R. DRISCOLL.